(12) United States Patent
Ohno et al.

(10) Patent No.: US 7,820,127 B2
(45) Date of Patent: Oct. 26, 2010

(54) METHOD AND APPARATUS FOR PRODUCING NITROGEN TRIFLUORIDE

(75) Inventors: Hiromoto Ohno, Kawasaki (JP); Toshio Ohi, Kawasaki (JP); Yuji Sakai, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 242 days.

(21) Appl. No.: 12/064,927

(22) PCT Filed: Aug. 25, 2006

(86) PCT No.: PCT/JP2006/316778

§ 371 (c)(1),
(2), (4) Date: Feb. 26, 2008

(87) PCT Pub. No.: WO2007/023968

PCT Pub. Date: Mar. 1, 2007

(65) Prior Publication Data

US 2009/0280051 A1    Nov. 12, 2009

(30) Foreign Application Priority Data

Aug. 26, 2005 (JP) ............. 2005-245781
Oct. 7, 2005 (JP) ............. 2005-295497
Oct. 7, 2005 (JP) ............. 2005-295498
Oct. 27, 2005 (JP) ............. 2005-313241

(51) Int. Cl.
*C01B 21/06* (2006.01)

(52) U.S. Cl. .................. 423/406; 423/409

(58) Field of Classification Search .......... 423/406, 423/409
See application file for complete search history.

(56) References Cited

U.S. PATENT DOCUMENTS

| 4,091,081 | A | | 5/1978 | Woytek et al. |
| 5,759,237 | A | * | 6/1998 | Li et al. ............ 95/41 |
| 6,010,605 | A | * | 1/2000 | Tarancon .......... 204/246 |
| 2001/0021624 | A1 | * | 9/2001 | Dill .................. 451/54 |
| 2003/0017098 | A1 | * | 1/2003 | Ohno et al. ........... 423/406 |
| 2004/0013595 | A1 | * | 1/2004 | Kwon et al. .......... 423/406 |
| 2004/0096387 | A1 | * | 5/2004 | Syvret et al. .......... 423/406 |
| 2004/0226658 | A1 | * | 11/2004 | Lai et al. .......... 156/345.48 |
| 2005/0202167 | A1 | * | 9/2005 | Wu et al. ........... 427/226 |
| 2005/0224093 | A1 | * | 10/2005 | Satchell, Jr. .......... 134/1.1 |
| 2006/0017043 | A1 | * | 1/2006 | Wu et al. ............ 252/372 |

FOREIGN PATENT DOCUMENTS

| JP | 55-8926 B2 | 3/1980 |
| JP | 2-255511 A | 10/1990 |
| JP | 2-255512 A | 10/1990 |
| JP | 2-255513 A | 10/1990 |
| JP | 5-105411 A | 4/1993 |
| JP | 2001-322806 A | 11/2001 |
| KR | 2002-0031121 A | 4/2002 |

OTHER PUBLICATIONS

Otto Ruff and Ernst Hanke; Fluorine and Ammonia; Z. anorg. u. allg. Chem., 197, 395-398 (1931).
Scott I. Morrow, Donald D. Perry, Murray S. Cohen and Carl Schoenfelder; Fluorination of Ammonia;J. Amer. Chem. Soc., vol. 82, pp. 5301-5304 (Oct. 20, 1960).

\* cited by examiner

*Primary Examiner*—Timothy C Vanoy
*Assistant Examiner*—Michelle Hou
(74) *Attorney, Agent, or Firm*—Sughrue Mion, PLLC (57) ABSTRACT

A method for producing nitrogen trifluoride related to the present invention is characterized in that a fluorine gas and an ammonia gas are fed into a tubular reactor and are reacted with each other in the presence of a diluting gas in a gaseous phase under the condition of no catalyst to produce a gas product mainly composed of nitrogen trifluoride and a solid product mainly composed of ammonium fluoride and/or acidic ammonium fluoride, and then the solid product attached to an inner wall of the tubular reactor is removed by means of a device for removing the solid product, which device is mounted to the tubular reactor.

24 Claims, 6 Drawing Sheets

METHOD AND APPARATUS FOR PRODUCING NITROGEN TRIFLUORIDE

TECHNICAL FIELD

The present invention relates to a method for effectively producing nitrogen trifluoride ($NF_3$) by reacting a fluorine gas ($F_2$ gas) with an ammonia gas ($NH_3$ gas) in the presence of a diluting gas in a gaseous phase under the condition of no catalyst, and an apparatus used in the method.

BACKGROUND ART $NF_3$ is employed, for example, as a gas for dry etching or a gas for cleaning or the like in a manufacturing process of a semiconductor device. In general, the production methods of this gas are roughly classified into chemical methods and electrolytic methods. Known chemical methods include a method (1) in which $F_2$ gas and $NH_3$ gas are injected into a fused acidic ammonium fluoride (see Japanese Patent Application Publication No. S55-8926 (Patent Document 1)), and a method (2) in which an $F_2$ gas is directly reacted with an $NH_3$ gas (see Japanese Patent Laid-Open Publication No. H02-255513 (Patent Document 2) and Japanese Patent Laid-Open Publication No. H05-105411 (Patent Document 3)).

On the other hand, known electrolytic methods are, for example, a method (3) in which the electrolyzation is carried out by using a fused acidic ammonium fluoride as an electrolyte and graphite as an anode, and a method (4) in which the electrolyzation is carried out by using a fused acidic ammonium fluoride as an electrolyte and nickel as an anode. In addition, Ruff et al. have reported that an $F_2$ gas is reacted with an $NH_3$ gas in a gaseous phase to chemically synthesize $NF_3$ with a yield of 6% or less (see Z. anorg. allg. chem. 197, 395 (1931) (Non-Patent Document 1)). Morrow et al. have also reported that $NF_3$ is synthesized in a gaseous phase in the same manner with a yield of 24.3% (see J. Amer. Chem. Soc. 82. 5301 (1960) (Non-Patent Document 2)).

Since an extremely reactive $F_2$ gas is used in the conventional direct fluorination reactions in which an $F_2$ gas is reacted with $NH_3$ to synthesize $NF_3$, there has been a problem that there is danger of explosion and corrosion. Further, the temperature inside a reactor increases because these reactions generate a large amount of heat, which fact leads to the decrease of the yield due to the generation of $N_2$, HF, $N_2F_2$, $N_2O$, $NH_4F$ (ammonium fluoride), $NH_4HF_2$ (acidic ammonium fluoride) and the like by side reaction and the decomposition and side reaction of $NF_3$, and which fact also results in the clogging of the reactor and pipes with solids of $NH_4F$ and $NH_4HF_2$.

Among these problems, Japanese Patent Laid-Open Publication No. H02-255511 (Patent Document 4) and Japanese Patent Laid-Open Publication No. H02-255512 (Patent Document 5) describe that the clogging of a reactor and pipes is improved by using a thin and rectangular-shaped reactor which has an ammonia gas injection tube on an upper side and a fluorine gas injection tube on a side, or by placing a reactor in a heating medium bath maintained at 80 to 250° C. However, both methods have a low yield of approximately 17% (on the basis of $NH_3$). In addition, Japanese Patent Laid-Open Publication No. H02-255513 (Patent Document 2) describes that the yield is increased to 59.5% (on the basis of $NH_3$) by using 3 to 20 times as much an $F_2$ gas as an $NH_3$ gas, but the yield is poor on the basis of $F_2$ and this method is not economical.

Japanese Patent Laid-Open Publication No. H05-105411 (Patent Document 3) describes that no clogging of a reactor and pipes occurs and the yield is improved to 63% (on the basis of $NH_3$) by spirally flowing raw material gases along the inner wall of a reactor to mix and react the raw material gases in the reactor. However, since an expensive $F_2$ gas is used, the problem is to further increase the yield.

Japanese Patent Laid-Open Publication No. 2001-322806 (Patent Document 6) describes that the yield is improved to approximately 76% (on the basis of $F_2$) by conducting the reaction at 80° C. or lower in the presence of a diluting gas, but there is a problem with the clogging of a reactor and the yield improvement.

[Patent Document 1] Japanese Patent Application Publication No. S55-8926

[Patent Document 2] Japanese Patent Laid-Open Publication No. H02-255513

[Patent Document 3] Japanese Patent Laid-Open Publication No. H05-105411

[Patent Document 4] Japanese Patent Laid-Open Publication No. H02-255511

[Patent Document 5] Japanese Patent Laid-Open Publication No. H02-255512

[Patent Document 6] Japanese Patent Laid-Open Publication No. 2001-322806

[Non-Patent Document 1] Z. anorg. allg. chem. 197, 395 (1931)

[Non-Patent Document 2] J. Amer. Chem. Soc. 82. 5301 (1960)

DISCLOSURE OF THE INVENTION

Problems to be Solved by the Invention

The present invention solves the above problems associated with the related art. It is an object of the invention to provide a method for continuously producing $NF_3$ industrially safely and efficiently by a direct fluorination method by reacting an $F_2$ gas with an $NH_3$ gas.

Means for Solving the Problems

As a result of earnest studies to solve the above problems, the present inventors have found improvement in a method for producing $NF_3$ by reacting an $F_2$ gas with an $NH_3$ gas in the presence of a diluting gas in a gaseous phase under the condition of no catalyst. Specifically, in a method for producing nitrogen trifluoride in which raw material gases are fed into a tubular reactor and are reacted to produce a gaseous product mainly composed of $NF_3$ and a product in a solid form (solid product) mainly composed of ammonium fluoride and/or acidic ammonium fluoride, the improvement is characterized in that $NF_3$ is produced in a good yield continuously by removing the solid product attached to the inner wall of the tubular reactor by means of various devices mounted on the tubular reactor or by conducting the reaction with use of two or more of the tubular reactors in a manner such that these two or more tubular reactors are switched.

When one hydrogen atom in $NH_3$ is substituted by a fluorine atom in the reaction of $F_2$ with $NH_3$, a high reaction heat of approximately −110 Kcal/mol is generated. Accordingly, when $NF_3$ is produced by the direct fluorination reaction in which an $F_2$ gas is reacted with an $NH_3$ gas, a high reaction heat of approximately −330 Kcal/mol is generated and the temperature is raised locally. If the temperature in the reactor increases, side reaction (the following chemical equation (2)) takes place predominantly in addition to the aimed $NF_3$ generation reaction (the following chemical equation (1)).

The present inventors have diligently studied to selectively permit the reaction of the above equation (1) to take place. They have then found that the reaction temperature has close relationships with the decrease of yield by increase in the linear velocity, turbulence of the gas flow, and reduced cooling efficiency, which are caused by the adherence of the solid product.

As a result, the present inventors have completed the present invention.

That is, the present invention is directed to a method for producing $NF_3$ as shown in the following [1] to [34].

[1] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor and reacting the gases in the presence of a diluting gas in a gaseous phase under the condition of no catalyst; and scraping off the solid product attached to an inner wall of the tubular reactor by means of a scraping device mounted inside the tubular reactor.

[2] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor and reacting the gases in the presence of a diluting gas in a gaseous phase under the condition of no catalyst; and removing the solid product attached to an inner wall of the tubular reactor by means of a hammering device mounted to the tubular reactor.

[3] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor and reacting the gases in the presence of a diluting gas in a gaseous phase under the condition of no catalyst; and removing the solid product attached to an inner wall of the tubular reactor by means of an air-type piston vibration device mounted outside the tubular reactor.

[4] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor and reacting the gases in the presence of a diluting gas in a gaseous phase under the condition of no catalyst, wherein the reaction is carried out using two or more of the tubular reactors in a manner such that the two or more tubular reactors are switched alternately.

[5] The method for producing nitrogen trifluoride according to the above [4], wherein the method further comprises removing the solid product attached to an inner wall of the tubular reactor by means of at least one device selected from a hammering device, a scraping device and an air-type piston vibration device, which device is mounted to the tubular reactor.

[6] The method for producing nitrogen trifluoride according to the above [1] or [5], wherein the solid product is scraped off by freely driving the scraping device up and down in a vertical direction inside the tubular reactor.

[7] The method for producing nitrogen trifluoride according to any of the above [1], [5] and [6], wherein the solid product is scraped off by freely rotating the scraping device inside the tubular reactor around a vertical axis passing through a center of a radial cross section of the tubular reactor.

[8] The method for producing nitrogen trifluoride according to the above [2] or [5], wherein the hammering device is an air knocker.

[9] The method for producing nitrogen trifluoride according to any of the above [1] to [4], wherein the tubular reactor is installed so that its longitudinal direction is in a vertical direction.

[10] The method for producing nitrogen trifluoride according to any of the above [1] to [4], wherein the gases flow in the tubular reactor in a vertically downward direction.

[11] The method for producing nitrogen trifluoride according to any of the above [1] to [4], wherein the diluting gas is at least one kind of gas selected from the group consisting of nitrogen, helium, argon, sulfur hexafluoride, hexafluoroethane, octafluoropropane and nitrogen trifluoride.

[12] The method for producing nitrogen trifluoride according to any of the above [1] to [4], wherein the diluting gas is recycled.

[13] The method for producing nitrogen trifluoride according to any of the above [1] to [4], wherein after the reaction, an unreacted fluorine gas is treated with an aqueous alkaline solution and/or alumina.

[14] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst; scraping off the solid product attached to an inner wall of the tubular reactor by means of a scraping device mounted inside the tubular reactor; and removing the solid product from the gas product by using a device and a filter that are mounted at a lower part of the reactor and separate and discharge solids.

[15] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst; knocking off the solid product attached to an inner wall of the tubular reactor by means of a hammering device mounted to the tubular reactor; and removing the solid product from the gas product by using a device and a filter that are mounted at a lower part of the reactor and separate and discharge solids.

[16] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst; knocking off the solid product attached to an inner wall of the tubular reactor by means of an air-type piston vibration device mounted outside the tubular reactor; and removing the solid product from the gas product by using a device and a filter that are mounted at a lower part of the reactor and separate and discharge solids.

[17] A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst, the reaction being carried out using two or more of the tubular reactors in a manner such that the two or more tubular reactors are switched alternately; and the method further comprising:

removing the solid product attached to an inner wall of the tubular reactor by using at least one device selected from a hammering device, a scraping device and an air-type piston vibration device, which device is mounted to the tubular reactor, and removing the solid product from the gas product by using a device and a filter that are mounted at a lower part of the reactor and separate and discharge solids.

[18] The method for producing nitrogen trifluoride according to the above [14] or [17], wherein the solid product is scraped off by freely driving the scraping device up and down in a vertical direction in the tubular reactor and/or by freely rotating the scraping device inside the tubular reactor around a vertical axis passing through a center of a radial cross section of the tubular reactor.

[19] The method for producing nitrogen trifluoride according to the above [15] or [17], wherein the hammering device is an air knocker.

[20] The method for producing nitrogen trifluoride according to any of the above [14] to [17], wherein the fluorine gas is a high-purity fluorine gas in which the total content of oxygen and an oxygen-containing compound is 0.1 vol % or less and the content of tetrafluoromethane is 50 vol ppm or less.

[21] The method for producing nitrogen trifluoride according to the above [20], wherein the oxygen-containing compound contained in the high-purity fluorine gas is at least one compound selected from the group consisting of NO, $NO_2$, $N_2O$, CO, $CO_2$, $H_2O$, $OF_2$ and $O_2F_2$.

[22] The method for producing nitrogen trifluoride according to any of the above [14] to [17], wherein the ammonia gas is a high-purity ammonia gas in which the total content of oxygen and an oxygen-containing compound is 10 vol ppm or less and the content of oil is 2 mass ppm or less.

[23] The method for producing nitrogen trifluoride according to the above [22], wherein the oxygen-containing compound contained in the high-purity ammonia gas is at least one compound selected from the group consisting of NO, $NO_2$, $N_2O$, CO, $CO_2$ and $H_2O$.

[24] The method for producing nitrogen trifluoride according to any of the above [14] to [17], wherein the fluorine gas is fed in a concentration of 3 mol % or less.

[25] The method for producing nitrogen trifluoride according to any of the above [14] to [17], wherein the ammonia gas is fed in a concentration of 6 mol % or less.

[26] The method for producing nitrogen trifluoride according to any of the above [14] to [17], wherein the fluorine gas and the ammonia gas are reacted together under a pressure of 0.05 to 1.0 MPa.

[27] The method for producing nitrogen trifluoride according to any of the above [14] to [17], wherein the device that is mounted at a lower part of the reactor and separates and discharges solids is an exchangeable solid storage tank.

[28] The method for producing nitrogen trifluoride according to any of the above [14] to [17], wherein the device that is mounted at a lower part of the reactor and separates and discharges solids is a device equipped with a rotary valve.

[29] The method for producing nitrogen trifluoride according to any of the above [1] to [4] and [14] to [17], wherein the tubular reactor has a cooling structure.

[30] The method for producing nitrogen trifluoride according to any of the above [1] to [4] and [14] to [17], wherein the fluorine gas and the ammonia gas are reacted together at a temperature of 60° C. or lower.

[31] The method for producing nitrogen trifluoride according to any of the above [1] to [4] and [14] to [17], wherein the fluorine gas and the ammonia gas are fed in a molar ratio (fluorine gas:ammonia gas) in the range of 1:1 to 1:2.

[32] An apparatus for producing nitrogen trifluoride comprising a tubular reactor equipped with fluorine gas feeding means, ammonia gas feeding means, a hammering device and reaction temperature controlling means; means for storing a solid product removed from the reactor; and means for separating the solid product from a gas component.

[33] An apparatus for producing nitrogen trifluoride comprising a tubular reactor equipped with fluorine gas feeding means, ammonia gas feeding means, an air-type piston vibration device and reaction temperature controlling means; means for storing a solid product removed from the reactor; and means for separating the solid product from a gas component.

[34] An apparatus for producing nitrogen trifluoride comprising two or more tubular reactors equipped with fluorine gas feeding means, ammonia gas feeding means, means for removing a solid product and reaction temperature controlling means; means for switching the reactors; means for storing the solid product removed from the reactor; and means for separating the solid product from a gas component.

ADVANTAGES OF THE INVENTION

The present invention addresses the problems encountered in the production of $NF_3$ by the reaction between an $F_2$ gas and an $NH_3$ gas, for example decreased yield caused by the clogging of a reactor and pipes. In the present invention, the raw material gases are fed into and reacted in a tubular reactor, which is equipped with a device for removing a solid product which is mainly composed of ammonium fluoride and/or acidic ammonium fluoride and which is attached to an inner wall of the tubular reactor. The method according to this embodiment of the invention can produce $NF_3$ continuously in a good yield and economically.

In another embodiment of the invention, two or more of the tubular reactors are used, and the raw material gases are fed into and reacted in the tubular reactor in a manner such that the two or more tubular reactors are switched alternately. This embodiment preferably involves a device for removing a solid product which is mainly composed of ammonium fluoride and/or acidic ammonium fluoride and which is attached to an inner wall of the tubular reactor. The method according to this embodiment of the invention can produce $NF_3$ continuously in a good yield and economically.

In a still another embodiment, a high-purity $F_2$ gas and a high-purity $NH_3$ gas are reacted together in order to reduce the content of hardly separable substances such as $CF_4$, and trace amounts of impurities contained in $NF_3$. The method according to this embodiment of the invention can produce NF$_3$ continuously in a good yield and economically.

DESCRIPTION OF THE SYMBOLS

1 Thermocouple insertion tube
21 Scraping device
22 Air knocker
23 Air-type piston vibration device
3, 31, 32, 33 Tubular reactor
4 Jacket (Cooling medium circulation system)
5 Solid storage tank
6 Filter
7 Gas discharge line
8 Discharged gas (mainly NF$_3$ and diluting gas)
9 Cooling medium

BEST MODE FOR CARRYING OUT THE INVENTION

Hereinafter, preferred embodiments of the present invention will be explained in detail.

First, the apparatus for producing nitrogen trifluoride of the present invention will be explained. The production apparatus of the present invention has a reactor equipped with fluorine gas feeding means, ammonia gas feeding means and a device for removing a solid product attached inside. The production apparatus may have two or more of the reactors equipped with a device for removing a solid product, and means for switching the reactors.

Examples of the reactors include a reactor equipped with an internal scraping device for scraping and removing the solid product, a reactor equipped with a hammering device, and a reactor equipped with an air-type piston vibration device. The reactor preferably has reaction temperature controlling means (for example, a cooling structure), and a jacket-type tubular reactor is an example.

The scraping device is not particularly limited as long as it has the same shape as a cross section of the reactor and has a structure which does not interrupt the passage of gases. Preferable examples include a ring-shaped thin plate equipped with a supporting bar. When a tubular reactor is installed so that the longitudinal direction of the reactor is in the vertical direction, it is preferable that the scraping device may be freely driven up and down in the vertical direction in the reactor and/or maybe freely rotated inside the reactor around a vertical axis passing through the center of a radial cross section of the reactor.

Examples of the hammering devices include an air knocker and a jet blaster. One or more air knockers are equipped outside the reactor, and they knock off the solid product attached to an inner wall of the reactor by giving a shock to the solid product, thereby preventing the clogging of the reactor. The jet blaster blows a strong gas directly to the solid product attached to an inner wall of the reactor and thereby knocks off the solid product and prevents the clogging of the reactor. Of these hammering devices, the air knocker is preferable.

The air-type piston vibration device is composed of, for example, a muffler, a top cover, an O-ring, a piston, a cylinder, a taper spring and the like. The device has operational advantages that it removes solids by vibration technology utilizing the longitudinal vibration of the piston, and prevents the clogging of the reactor and causes the solids to fall in the reactor. Specifically, one or more air-type piston vibration devices are equipped outside the reactor and knock off the solid product attached to an inner wall of the reactor by giving a shock to the solid product, thereby preventing the clogging of the reactor.

Any one of the scraping device, hammering device and air-type piston vibration device may be used. Preferably, the scraping device and hammering device, or the scraping device and air-type piston vibration device are used in combination.

Further, the production apparatus of the present invention preferably has means for storing the solid product removed from the reactor, and means for separating the solid product from a gas component. Specifically, a device for separating and discharging solids (hereinafter, referred to as "solid separating and discharging device") is preferably provided on a lower part of the reactor. The solid separating and discharging device preferably has a cross section larger than that of the reactor. More specifically, the solid separating and discharging device is preferably a solid storage tank which is periodically exchangeable. The device preferably has a structure in which two such tanks are arranged in series and are separated through a rotary valve, or a structure in which two such tanks are provided and are switched alternately. Furthermore, the solid separating and discharging device is preferably equipped with a gas discharge line at an upper part with a filter inbetween, and the objective NF$_3$ and the diluting gas are guided to a subsequent step through the discharge line. The filter removes trace amounts of solids accompanying the gas. Moreover, plural, for example two, gas discharge lines may be provided and the flow of gas may be periodically switched to allow for continuous operation.

The fluorine gas feeding means, ammonia gas feeding means, and means for switching the reactors may be conventional.

Among the constitutional devices and components, the reactors, the solid storage tank and the like preferably comprise SUS 316.

Next, the method for producing nitrogen trifluoride of the present invention will be explained. When two or more of the reactors equipped with a device for removing the solid product are used, the reaction is carried out in a manner such that these two or more reactors are switched. It is necessary that the raw materials F$_2$ gas and NH$_3$ gas are fed into the reactor through respective pipes and are brought into contact and are mixed for the first time in the reactor. If the F$_2$ gas and the NH$_3$ gas are mixed at an entrance of the reactor and the mixed gas is fed into the reactor, the reaction proceeds at the entrance and solids are generated to clog the pipes.

Since the $F_2$ gas used in the direct fluorination reaction is extremely reactive, the reaction of $F_2$ with hydrogen-containing $NH_3$ in high concentrations is not preferable because there is danger of combustion and explosion and the large reaction heat increases the temperature to reduce the yield of the target product $NF_3$. For this reason, it is necessary that the $F_2$ gas and the $NH_3$ gas are diluted and reacted in low concentrations. The $F_2$ gas is preferably diluted with a diluting gas and is fed at 3 mol % or less of the total volume of the gases fed, and the $NH_3$ gas is preferably diluted with a diluting gas and is fed at 6 mol % or less of the total volume of the gases fed. That is, the total of the raw material gases ($NH_3$ gas and $F_2$ gas) is preferably 9 mol % or less, and the diluting gas preferably accounts for 91 mol % or more. If the $NH_3$ gas concentration exceeds 6 mol % and the fluorine gas concentration exceeds 3 mol %, the temperature may be rapidly increased due to large reaction heat and the danger of combustion, explosion and the like is raised. Examples of the diluting gases include inert gases such as nitrogen, helium, argon, sulfur hexafluoride, hexafluoroethane, octafluoropropane, nitrogen trifluoride and the like. These diluting gases may be used singly or two or more kinds may be used in combination. Of these diluting gases, sulfur hexafluoride, hexafluoroethane and octafluoropropane are preferable in consideration of the specific heat of the diluting gases, and separation and purification in distillation.

The $F_2$ gas and the $NH_3$ gas are preferably fed into the reactor in a molar ratio ($F_2$ gas:$NH_3$ gas) in the range of 1:1 to 1:2. It is not preferable to excessively feed the $F_2$ gas because the temperature may be rapidly increased due to large reaction heat and the danger of combustion, explosion and the like is raised. It is not preferable to feed the $NH_3$ gas in excess, more than two times molar amount, relative to the $F_2$ gas because the yield of $NF_3$ based on $NH_3$ is decreased.

The $F_2$ gas and $NH_3$ gas diluted as described above are fed from an upper part of the reactor, and are mixed and contacted in the reactor and are thereby reacted together in a gaseous phase under the condition of no catalyst. When two or more reactors are used, these gases are fed from an upper part of one of the reactors, and are mixed and contacted in the reactor and are thereby reacted together in a gaseous phase under the condition of no catalyst. As mentioned above, the reaction temperature is closely related with the main reaction of the above equation (1) and the side reaction of the above equation (2). In order to selectively allow the main reaction of the above equation (1) to take place, the reaction temperature is preferably 60° C. or less, more preferably −20 to 60° C., further more preferably −20 to 50° C., and especially preferably −20 to 35° C. The reaction temperature may be preferably controlled by, for example, a method in which the temperature inside the reactor is controlled by an external cooling system wherein a heating medium is circulated in a jacket, and a method in which the raw materials and/or the diluting gas is cooled before it is fed into the reactor and then the cooled gas is fed. Further, the reaction pressure is preferably in the range of 0.05 to 1.0 MPa. If the reaction pressure exceeds 1.0 MPa, economical disadvantages are caused, such as requirement of high pressure resistance of the apparatus. When the reactor is installed so that the longitudinal direction of the reactor is in the vertical direction, it is preferable that the gases flow vertically downward inside the reactor.

The $F_2$ gas and $NH_3$ gas often contain oxygen and oxygen-containing compounds. The oxygen-containing compounds contained in the $F_2$ gas include NO, $NO_2$, $N_2O$, CO, $CO_2$, $H_2O$, $OF_2$ and $O_2F_2$, and these compounds are contained singly or in combination of two or more kinds. The oxygen-containing compounds contained in the $NH_3$ gas include NO, $NO_2$, $N_2O$, CO, $CO_2$ and $H_2O$, and these compounds are contained singly or in combination of two or more kinds. Further, the $F_2$ gas may contain tetrafluoromethane ($CF_4$) and the $NH_3$ gas may contain methane, hydrogen, hydrogen-containing compounds and oils. The oxygen and oxygen-containing compounds produce by-products as impurities such as $N_2O$ and $N_2F_2$, and are reacted with the $F_2$ gas to produce by-products such as $CF_4$, COF, $COF_2$ and $OF_2$. The methane contained in the $NH_3$ gas is reacted with the $F_2$ gas to produce a by-product $CF_4$. The $CF_4$ produced as a by-product and the $CF_4$ contained in the $F_2$ gas have a boiling point of −128° C. which is close to the boiling point of the target product $NF_3$. Because of this fact, the separation of this gas is very difficult. In addition, the hydrogen and the hydrogen-containing compounds contained in the $NH_3$ gas are not preferable because they are reacted with the $F_2$ gas to produce hydrogen fluoride (HF), which is reacted with the $NH_3$ gas to produce $NH_4F$. The oils contained in the $NH_3$ gas are reacted with the $F_2$ gas to produce by-products such as $CF_4$, COF, $COF_2$ and $OF_2$. As described above, the trace amounts of impurities contained in the raw material gases produce many kinds of by-products as impurities. Thus, the $F_2$ gas and $NH_3$ gas are preferably of high purity and the impurities should be minimized.

By utilizing the difference of the boiling points between the $F_2$ gas (boiling point: −188° C.) and $CF_4$ (boiling point: −128° C.), the $F_2$ gas may be purified by low-temperature distillation at a temperature of −150 to −160° C. using, for example, liquid nitrogen to remove $CF_4$ contained in the $F_2$ gas. By this treatment, the oxygen and oxygen-containing compounds are also removed. The $CF_4$ content in the purified $F_2$ gas is preferably 50 vol ppm or less, and the total content of the oxygen and oxygen-containing compounds is preferably 0.1 vol % or less.

On the other hand, the $NH_3$ gas may be purified by evaporating liquid ammonia with a heat exchanger or the like and repeating cooling recovery to remove the oils, or by repeating distillation purification and adsorption to remove the hydrogen, hydrogen-containing compounds, methane, oxygen and oxygen-containing compounds. The content of the oils in the purified $NH_3$ gas is preferably 2 mass ppm or less, and the total content of the oxygen and oxygen-containing compounds is preferably 10 vol ppm or less.

From the viewpoint of reducing the impurities after the reaction, the diluting gas is preferably a high purity gas containing as little as possible of impurities. For example, sulfur hexafluoride having a purity of 99.999% or more may be preferably used.

The above reaction produces a gaseous product mainly composed of nitrogen trifluoride. As the reaction proceeds, a solid product mainly composed of ammonium fluoride and/or acidic ammonium fluoride is produced and it adheres to an inner wall of the reactor. The attached solid product causes, for example, temperature rise due to the reduced cooling efficiency, turbulence of the gas flow and increase of linear velocity and causes low yield and selectivity of the target product $NF_3$. Thus, the solid product should be removed periodically or continuously. For this reason, the solid product is scraped off from the inner wall of the reactor using the scraping device mounted inside the reactor. Alternatively, the solid product is knocked off from the inner wall of the reactor by means of the hammering device or air-type piston vibration device equipped to the reactor. The knocking-off and scraping-off operations are preferably used in combination. Depending on the structure, the scraping device may be freely driven up and down or may be freely driven up and down and be rotated by means of a magnet or the like.

The solid product scraped off or knocked off is collected in the solid separating and discharging device provided at a lower part of the reactor. To facilitate the collection, the reactor is preferably installed so that the longitudinal direction of the reactor is in the vertical direction.

$NF_3$ may be produced efficiently and continuously by reacting the $F_2$ gas with the $NH_3$ gas while removing the solid product attached to the inner wall of the reactor as mentioned above. However, the yield of $NF_3$ is often decreased after a long time. For this reason, in the present invention, $NF_3$ is preferably produced by using two or more of the reactors in combination in a manner such that the reactors are switched alternately. Specifically, when two reactors A and B are used, $NF_3$ is produced in the reactor A for a given length of time and subsequently the reaction is started in the reactor B by feeding the raw material gases. After that, the feeding of the raw material gases into the reactor A is stopped, and $NF_3$ is produced only in the reactor B. The reactor A is washed during the production in the reactor B. After $NF_3$ is produced in the reactor B for a given length of time, the reactors are switched in the same way as mentioned above and $NF_3$ is again produced in the reactor A. By repeating this series of operations, $NF_3$ may be produced stably and in high yield without stopping the production line.

By further separating and purifying the solid product collected in the solid separating and discharging device, the resultant ammonium fluoride and acidic ammonium fluoride may be used for other applications.

On the other hand, the gaseous product contains a small amount of an unreacted $F_2$ gas and the like, in addition to the target product $NF_3$ and the diluting gas. For this reason, the unreacted $F_2$ gas is preferably removed from the gaseous product that has been passed through the filter provided at an upper part of the solid separating and discharging device. The unreacted $F_2$ gas may be preferably removed by, for example, a dry removing method in which the unreacted $F_2$ gas is reacted using alumina (aluminum oxide), or a wet removing method in which the unreacted $F_2$ gas is removed by being brought into contact with an aqueous alkaline solution. Both methods may be used in combination depending on the conditions. Preferable examples of the aqueous alkaline solutions include an aqueous sodium hydroxide solution and an aqueous potassium hydroxide solution.

Since moisture is contained in the mixed gas of $NF_3$ and the diluting gas from which the unreacted $F_2$ gas has been removed, the mixed gas is preferably dehydrated using a molecular sieve or the like. Preferable examples of the molecular sieves include 3A, 4A and 5A. These molecular sieves may be used singly or two or more kinds may be used in combination.

The dehydrated gas is separated into $NF_3$ and the diluting gas in distillation and separation steps. $NF_3$ is recovered as a product, and the diluting gas may be reused for diluting the raw materials and the reaction system.

EXAMPLES

Hereinafter, the present invention will be explained by Examples, but the present invention is not limited to these examples.

Examples in which Reactor Equipped with Scraping Device was Used

Example A1

Figure 1:
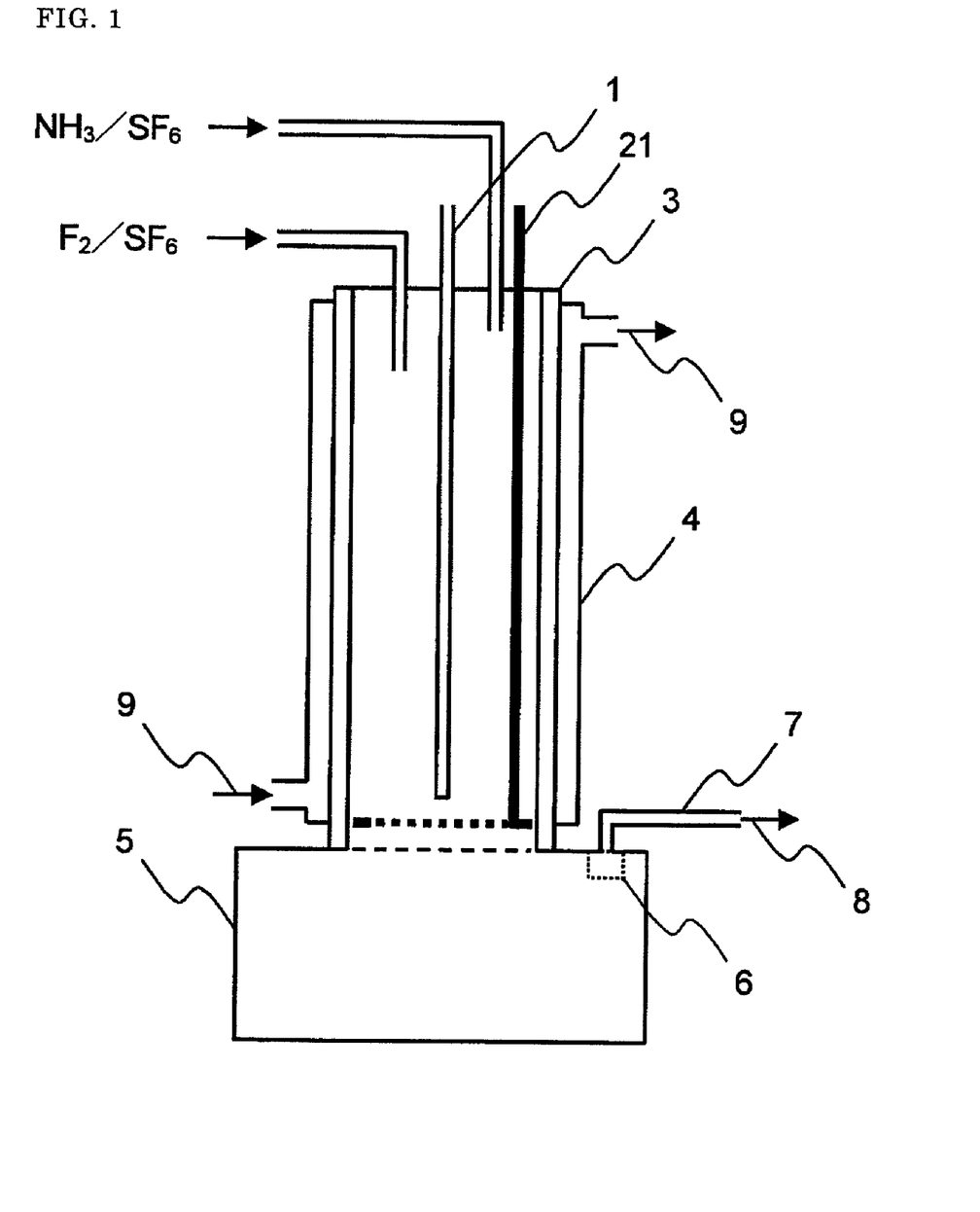
FIG. 1 is a schematic view showing an example of a production apparatus used for a method for producing nitrogen trifluoride of the present invention.

An apparatus shown in FIG. 1 was used. As shown in FIG. 1, a SUS 316 tubular reactor 3 (with a jacket 4, cooling system with cooling medium circulation) having an internal diameter of 54.9 mm and a length of 480 mm was equipped with two raw material gas feeding lines. In the reactor, an automatically vertically movable scraping device 21 was provided in which a shaft (bar) and a handle were mounted on a ring-shaped thin plate having an external diameter of 53.9 mm and an internal diameter of 53.1 mm. A SUS 316L solid storage tank 5 having an internal diameter of 109.8 mm and a length of 200 mm was mounted at a lower part of the tubular reactor 3. A gas discharge line 7 was connected through a filter 6 to an upper part of the solid storage tank 5.

Fed in the tubular reactor 3 were a mixed gas of an $F_2$ gas at a rate of 2.3 NL/hr and sulfur hexafluoride at a rate of 59.64 NL/hr from one of the raw material gas feeding lines and a mixed gas of an $NH_3$ gas at a rate of 3.06 NL/hr and sulfur hexafluoride at a rate of 50 NL/hr from the other raw material gas feeding line. The $F_2$ gas and the $NH_3$ gas were mixed and reacted in the reactor 3. During the reaction, the scraping device 21 was reciprocated twice in the vertical direction in the reactor 3 every one hour. The reaction was carried out while cooling the reactor 3 with a cooling medium. After two hours from the start of the reaction, the peak temperature in the reactor 3 was 16.2° C.

For the gas collected from the gas discharge line, unreacted fluorine gas and hydrogen fluoride produced were analyzed with an aqueous potassium iodide solution, and other components were analyzed by gas chromatography. The results are shown below.

$F_2$ reactivity: 99.7%
$NF_3$ yield: 98.9% (on the basis of $F_2$)
HF generation rate: Not detected The reaction was further continued, and the peak temperature in the reactor 3 after 10 hours from the start of the reaction was 16.4° C. The gas collected from the gas discharge line was analyzed in the same way as above. The results are shown below.

$F_2$ reactivity: 99.4%
$NF_3$ yield: 98.1% (on the basis of $F_2$)
HF generation rate: Not detected The reaction was further continued, and the peak temperature in the reactor 3 after 24 hours from the start of the reaction was 16.4° C. The gas collected from the gas discharge line was analyzed in the same way as above. The results are shown below.

$F_2$ reactivity: 99.6%
$NF_3$ yield: 98.8% (on the basis of $F_2$)
HF generation rate: Not detected As evident from these results, the target product $NF_3$ was produced continuously in high yield by feeding the raw material gases at low concentrations, controlling the temperature in the reactor and removing the solid product from the reactor.

Example A2

The reaction was carried out in the same way as in Example A1 except that the reactor 3 was cooled with a cooling medium so that the peak temperature in the reactor 3 was 38.5° C. After 2 hours from the start of the reaction, the gas collected from the gas discharge line was analyzed in the same way as in Example A1. The results are shown below.

$F_2$ reactivity: 94.3%
$NF_3$ yield: 77.4% (on the basis of $F_2$)
HF generation rate: 22.6%

The comparison of Example A1 with Example A2 showed that the yield of $NF_3$ was further improved by lowering the peak temperature in the reactor.

Comparative Example A1

Figure 6:
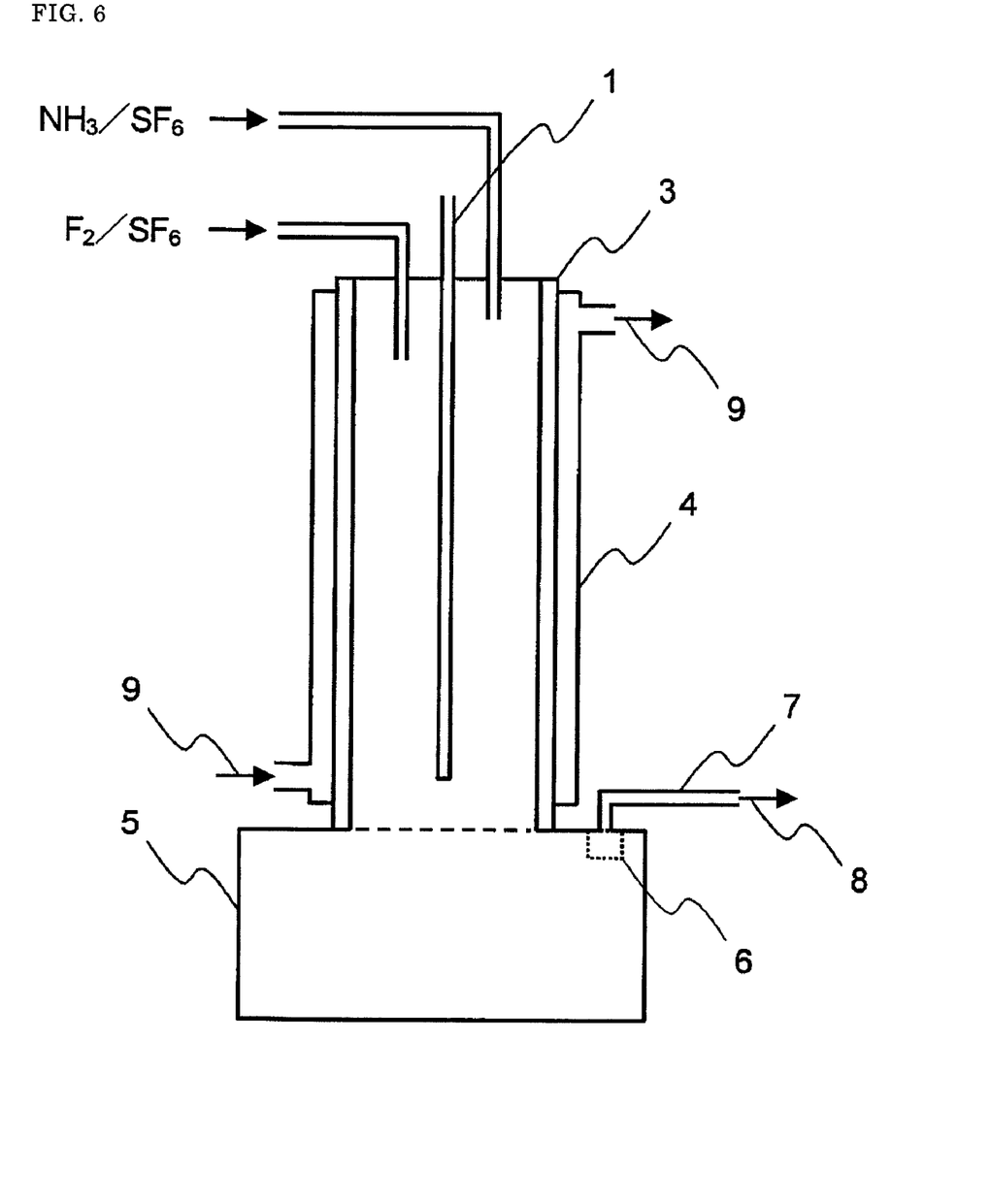
FIG. 6 is a schematic view showing an example of a production apparatus used for a conventional method for producing nitrogen trifluoride.

An apparatus shown in FIG. 6 was used. As shown in FIG. 6, a SUS 316L tubular reactor 3 (with a jacket 4, cooling system with cooling medium circulation) having an internal diameter of 54.9 mm and a length of 480 mm was equipped with two raw material gas feeding lines. A SUS 316L solid storage tank 5 having an internal diameter of 109.8 mm and a length of 200 mm was mounted at a lower part of the tubular reactor 3. A gas discharge line 7 was connected through a filter 6 to an upper part of the solid storage tank 5.

Fed in the tubular reactor 3 were a mixed gas of an $F_2$ gas at a rate of 2.3 NL/hr and sulfur hexafluoride at a rate of 59.64 NL/hr from one of the raw material gas feeding lines and a mixed gas of an $NH_3$ gas at a rate of 3.06 NL/hr and sulfur hexafluoride at a rate of 50 NL/hr from the other raw material gas feeding line. The $F_2$ gas and the $NH_3$ gas were mixed and reacted in the reactor 3. The reaction was conducted while cooling the reactor 3 with a cooling medium. After two hours from the start of the reaction, the peak temperature in the reactor 3 was 16.8° C.

The gas collected from the gas discharge line was analyzed in the same way as in Example A1. The results are shown below.
  $F_2$ reactivity: 99.3%
  $NF_3$ yield: 98.2% (on the basis of $F_2$)
  HF generation rate: Not detected As evident from these results, $NF_3$ was produced with a high yield (98.2%) by feeding the raw material gases at low concentrations and controlling the temperature in the reactor.

The reaction was further continued, and the peak temperature in the reactor 3 after 6 hours from the start of the reaction was 28.8° C. The gas collected from the gas discharge line was analyzed in the same way as above. The results are shown below.
  $F_2$ reactivity: 95.1%
  $NF_3$ yield: 81.4% (on the basis of $F_2$)
  HF generation rate: 15.8%

As evident from these results, the yield of $NF_3$ decreased to 81.4% because the peak temperature in the reactor was increased by the formation of solid product.

The reaction was stopped at this point. Visual observation of the inside of the reactor showed that a white solid product (mainly composed of ammonium fluoride and a very small portion of acidic ammonium fluoride) adhered to the inner wall downward from a central part of the reactor 3. The solid product was about to clog the reactor.

[Examples in which Reactor Equipped with Hammering Device was Used]

<Preparation of $F_2$ Gas>

Preparation Example B1

A composition of KF•1.8HF to KF•2.5HF was subjected to molten-salt-electrolysis at approximately 100° C. to generate $F_2$ at an anode, and the gas was collected. The collected crude $F_2$ gas was purified by separating HF using liquid nitrogen. Subsequently, the resultant $F_2$ gas was subjected to low-temperature distillation with liquid nitrogen to give a high purity fluorine gas. Oxygen, oxygen-containing compounds and tetrafluoromethane contained in the high purity fluorine gas were determined by TCD method and FID method of gas chromatography (GC) and with a gas chromatography mass spectrometer (GC-MS). The results are shown below.
  Oxygen and oxygen-containing compounds 0.0551 vol %
  Tetrafluoromethane 0.0016 vol %

Preparation Example B2

A composition of KF•1.8HF to KF•2.5HF was subjected to molten-salt-electrolysis at approximately 100° C. to generate $F_2$ at an anode, and the gas was collected. The collected crude $F_2$ gas was purified by separating HF using liquid nitrogen, and a fluorine gas was obtained. Oxygen, oxygen-containing compounds and tetrafluoromethane contained in the fluorine gas were determined by TCD method and FID method of gas chromatography (GC) and with a gas chromatography mass spectrometer (GC-MS). The results are shown below.
  Oxygen and oxygen-containing compounds 0.3820 vol %
  Tetrafluoromethane 0.0138 vol %<

<Preparation of $NH_3$ Gas>

Preparation Example B3

Liquid ammonia, produced by a high pressure catalytic method which was an industrial manufacturing method, was evaporated with use of a heat exchanger and was collected by cooling. The collected product was further purified by distillation to give high purity ammonia. Oxygen, oxygen-containing compounds, methane and oils contained in the high purity ammonia were determined by TCD method and FID method of gas chromatography (GC) and with a gas chromatography mass spectrometer (GC-MS). The results are shown below.
  Oxygen and oxygen-containing compound <0.5 vol ppm
  Methane <0.1 vol ppm
  Oils <0.1 mass ppm Preparation Example B4

Liquid ammonia, produced by a high pressure catalytic method which was an industrial manufacturing method, was analyzed by TCD method and FID method of gas chromatography (GC) and with a gas chromatography mass spectrometer (GC-MS) to determine oxygen, oxygen-containing compounds, methane and oils contained in the liquid ammonia. The results are shown below.
  Oxygen and oxygen-containing compound 0.0131 vol %
  Methane 0.0007 vol %
  Oils 0.0007 mass %

Example B1

Figure 2:
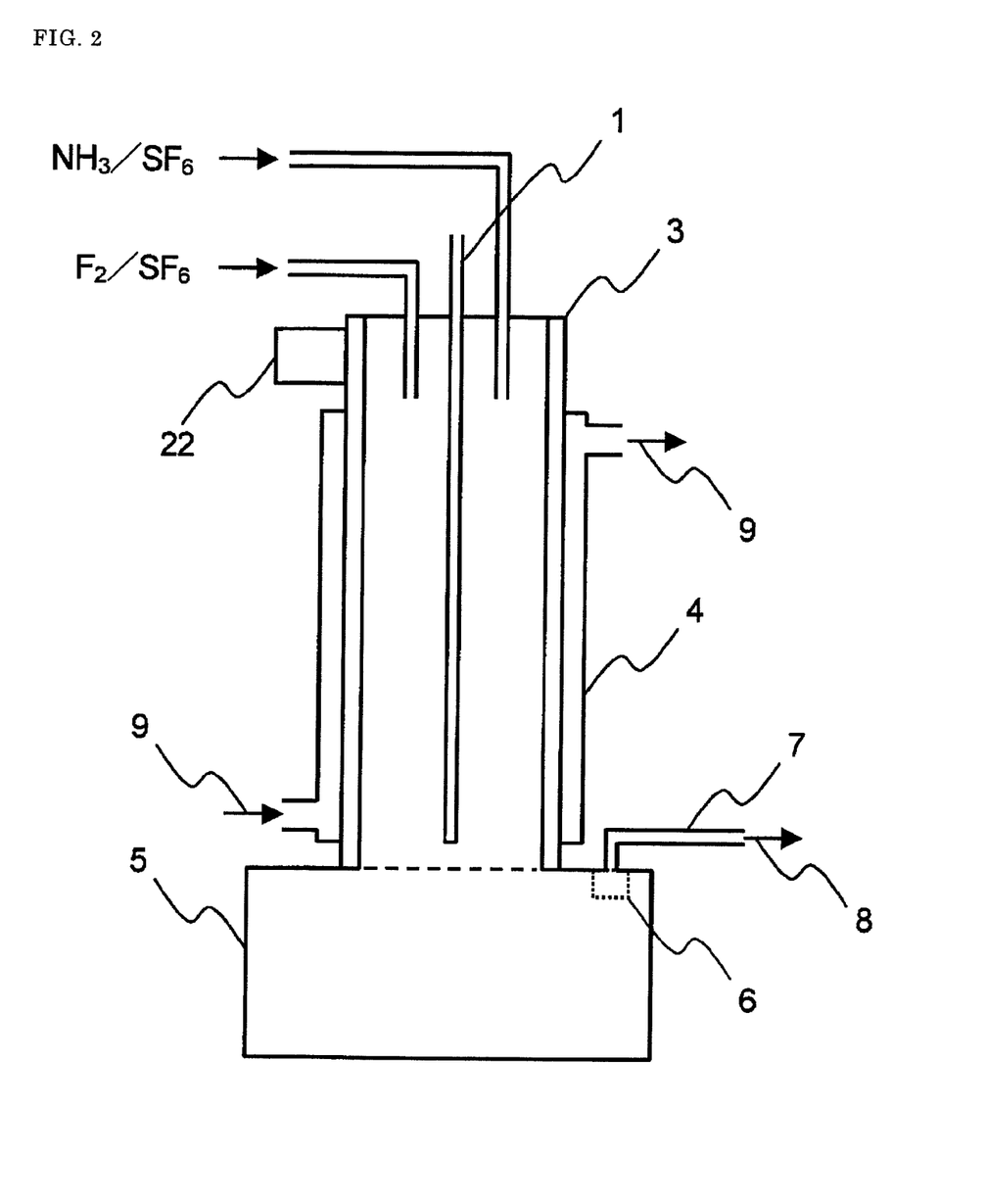
FIG. 2 is a schematic view showing an example of a production apparatus used for a method for producing nitrogen trifluoride of the present invention.

An apparatus shown in FIG. 2 was used. As shown in FIG. 2, a SUS 316L tubular reactor 3 (with a jacket 4, cooling system with cooling medium circulation) having an internal diameter of 54.9 mm and a length of 700 mm was equipped with two raw material gas feeding lines. On the reactor, an air knocker 22 (Air Knocker SK-30, manufactured by Seishin Enterprise Co., Ltd.) was provided. A SUS 316L solid storage tank 5 having an internal diameter of 109.8 mm and a length of 350 mm was mounted at a lower part of the tubular reactor 3. A gas discharge line 7 was connected through a filter 6 to an upper part of the solid storage tank 5.

Fed in the tubular reactor 3 were a mixed gas of the high purity $F_2$ gas obtained in Preparation Example B1 at a rate of 2.3 NL/hr and sulfur hexafluoride (purity:>99.999%) at a rate of 59.64 NL/hr from one of the raw material gas feeding lines and a mixed gas of the high purity $NH_3$ gas obtained in Preparation Example B3 at a rate of 3.06 NL/hr and sulfur hexafluoride (purity:>99.999%) at a rate of 50 NL/hr from the other raw material gas feeding line. The $F_2$ gas and the $NH_3$ gas were mixed and reacted in the reactor 3. During the reaction, the air knocker 22 was operated at a knocker shocking interval of 30 minutes by a timer. The reaction was carried out while cooling the reactor 3 with a cooling medium. After 4 hours from the start of the reaction, the peak temperature in the reactor 3 was 16.2° C.

The gas collected from the gas discharge line was treated with an aqueous potassium iodide solution, and thereby unreacted fluorine gas and hydrogen fluoride produced were removed. The gas was analyzed by gas chromatography. The results are shown below.

$NF_3$ yield: 97.8% (on the basis of $F_2$)
$CF_4$: 0.0016 vol %
$COF_2$: Not detected
COF: Not detected
$OF_2$: Not detected
$N_2O$: Not detected As evident from the results, the generation of by-products which were small amounts of impurities, especially $CF_4$, was suppressed by using the high purity fluorine gas and the high purity ammonia gas. The results also showed that the target product $NF_3$ was produced continuously in high yield (not less than 97%) by feeding the raw material gases at low concentrations, controlling the temperature in the reactor and removing the solid product from the reactor.

The reaction was further continued, and the peak temperature in the reactor 3 after 24 hours from the start of the reaction was 16.1° C. The gas collected from the gas discharge line was analyzed in the same way as above. The result is shown below.

$NF_3$ yield: 98.1% (on the basis of $F_2$)

The reaction was further continued, and the peak temperature in the reactor 3 after 48 hours from the start of the reaction was 15.8° C. The gas collected from the gas discharge line was analyzed in the same way as above. The result is shown below.

$NF_3$ yield: 97.7% (on the basis of $F_2$)

Thereafter, the feeding of the raw material gases and the diluting gases was stopped. Visual observation of the inside of the reactor and solid storage tank showed that there was no white solid product attached to the inside of the reactor, and that a white solid product (mainly composed of ammonium fluoride) was accumulated in the solid storage tank.

As evident from these results, the target product $NF_3$ was produced continuously in high yield by feeding the raw material gases at low concentrations, controlling the temperature in the reactor and knocking off the solid product from the reactor.

Example B2

The reaction was carried out in the same way as in Example B1 except that the $F_2$ gas obtained in Preparation Example B2 was used in place of the high purity $F_2$ gas and the $NH_3$ gas obtained in Preparation Example B4 was used in place of the high purity $NH_3$ gas. The peak temperature in the reactor 3 after 4 hours from the start of the reaction was 16.3° C.

The gas collected from the gas discharge line was treated with an aqueous potassium iodide solution, and thereby unreacted fluorine gas and hydrogen fluoride produced were removed. The gas was analyzed by gas chromatography. The results are shown below.

$NF_3$ yield: 97.2% (on the basis of $F_2$)
$CF_4$: 0.0145 vol %
$COF_2$: 0.0002 vol %
COF: 0.0001 vol %
$OF_2$: 0.0001 vol %
$N_2O$: 0.0002 vol %

The comparison of Example B1 with Example B2 showed that the use of the high purity raw material gases suppressed the generation of by-products which were small amounts of impurities.

Reference Example B1

The gas of Example B2 from which the unreacted fluorine gas and the hydrogen fluoride had been removed was cooled and collected. Distillation for separating $CF_4$ was attempted by a known method, but the $CF_4$ content in $NF_3$ was not reduced.

[Examples in which Reactor Equipped with Air-Type Piston Vibration Device was Used]

<Preparation of $F_2$ Gas>

Preparation Example C1

A composition of KF•1.8HF to KF•2.5HF was subjected to molten-salt-electrolysis at approximately 100° C. to generate $F_2$ at an anode, and the gas was collected. The collected crude $F_2$ gas was purified by separating HF using liquid nitrogen. Subsequently, the resultant $F_2$ gas was subjected to low-temperature distillation with liquid nitrogen to give a high purity fluorine gas. Oxygen, oxygen-containing compounds and tetrafluoromethane contained in the high purity fluorine gas were determined by TCD method and FID method of gas chromatography (GC) and with a gas chromatography mass spectrometer (GC-MS). The results are shown below.

Oxygen and oxygen-containing compounds 0.0531 vol %
Tetrafluoromethane 0.0013 vol %

Preparation Example C2

A composition of KF•1.8HF to KF•2.5HF was subjected to molten-salt-electrolysis at approximately 100° C. to generate $F_2$ at an anode, and the gas was collected. The collected crude $F_2$ gas was purified by separating HF using liquid nitrogen to give a fluorine gas. Oxygen, oxygen-containing compounds and tetrafluoromethane contained in the fluorine gas were determined by TCD method and FID method of gas chromatography (GC) and with a gas chromatography mass spectrometer (GC-MS). The results are shown below.

Oxygen and oxygen-containing compounds 0.3721 vol %
Tetrafludromethane 0.0129 vol %<

<Preparation of $NH_3$ Gas>

Preparation Example C3

Liquid ammonia, produced by a high pressure catalytic method which was an industrial manufacturing method, was evaporated with use of a heat exchanger and was collected by cooling. The collected product was further purified by distillation to give high purity ammonia. Oxygen, oxygen-containing compounds, methane and oils contained in the high purity ammonia were determined by TCD method and FID method of gas chromatography (GC) and with a gas chromatography mass spectrometer (GC-MS). The results are shown below.

Oxygen and oxygen-containing compound <0.5 vol ppm
Methane <0.1 vol ppm
Oils <0.1 mass ppm Preparation Example C4

Liquid ammonia, produced by a high pressure catalytic method which was an industrial manufacturing method, was analyzed by TCD method and FID method of gas chromatography (GC) and with a gas chromatography mass spectrometer (GC-MS) to determine oxygen, oxygen-containing compounds, methane and oils contained in the liquid ammonia. The results are shown below.

Oxygen and oxygen-containing compound 0.0121 vol %
Methane 0.0006 vol %
Oils 0.0006 mass %

Example C1

Figure 3:
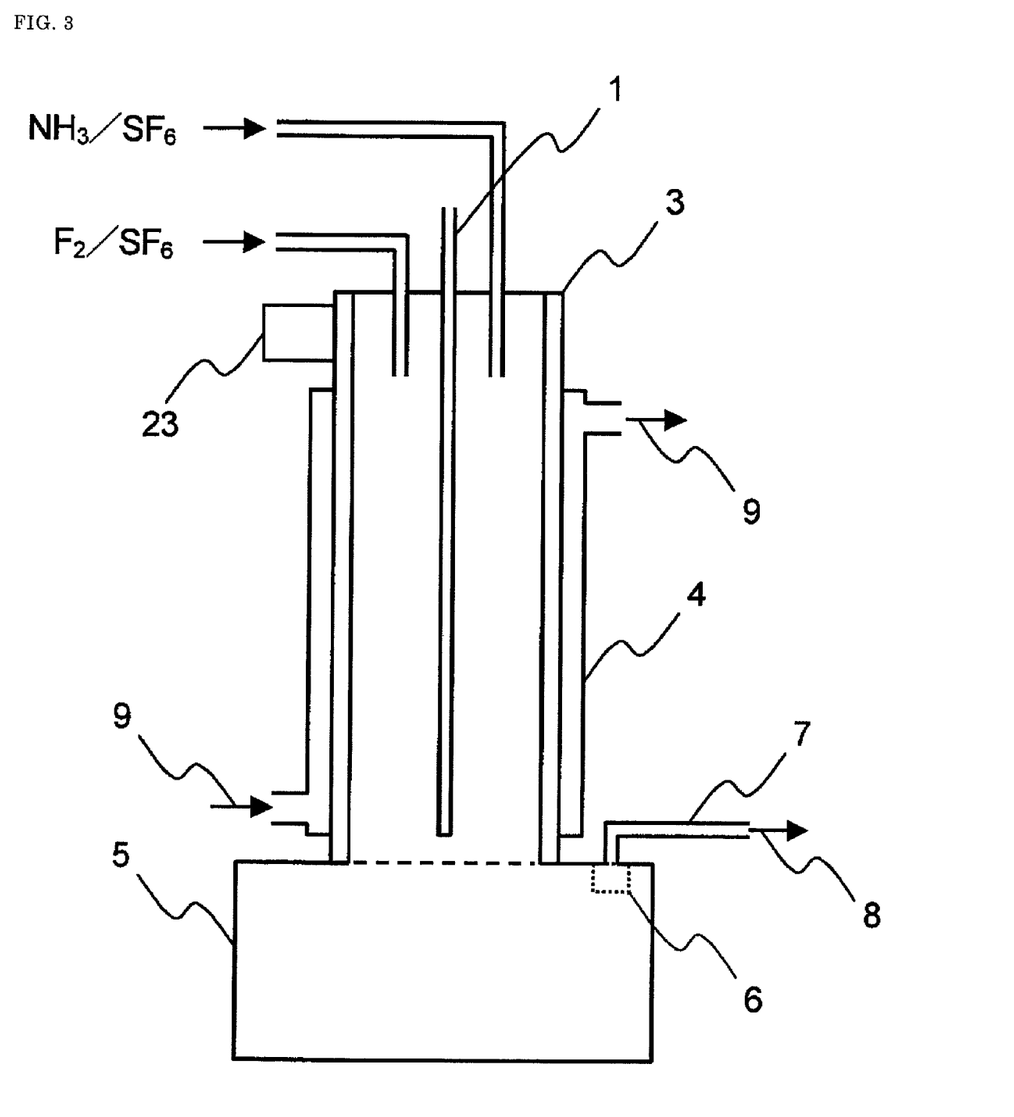
FIG. 3 is a schematic view showing an example of a production apparatus used for a method for producing nitrogen trifluoride of the present invention.

An apparatus shown in FIG. 3 was used. As shown in FIG. 3, a SUS 316L tubular reactor 3 (with a jacket 4, cooling system with cooling medium circulation) having an internal diameter of 54.9 mm and a length of 700 mm was equipped with two raw material gas feeding lines. On the reactor, an air-type piston vibration device 23 (EPV 18, manufactured by EXEN Corp.) was provided. A SUS 316L solid storage tank 5 having an internal diameter of 109.8 mm and a length of 350 mm was mounted at a lower part of the tubular reactor 3. A gas discharge line 7 was connected through a filter 6 to an upper part of the solid storage tank 5.

Fed in the tubular reactor 3 were a mixed gas of the high purity $F_2$ gas obtained in Preparation Example C1 at a rate of 2.3 NL/hr and sulfur hexafluoride (purity:>99.999%) at a rate of 59.64 NL/hr from one of the raw material gas feeding lines and a mixed gas of the high purity $NH_3$ gas obtained in Preparation Example C3 at a rate of 3.06 NL/hr and sulfur hexafluoride (purity:>99.999%) at a rate of 50 NL/hr from the other raw material gas feeding line. The $F_2$ gas and the $NH_3$ gas were mixed and reacted in the reactor 3. During the reaction, the air-type piston vibration device 23 was driven at a frequency of 105 Hz and at a vibration force of 70 N. The reaction was carried out while cooling the reactor 3 with a cooling medium. After 4 hours from the start of the reaction, the peak temperature in the reactor 3 was 16.0° C.

The gas collected from the gas discharge line was treated with an aqueous potassium iodide solution, and thereby unreacted fluorine gas and hydrogen fluoride produced were removed. The gas was analyzed by gas chromatography. The results are shown below.

$NF_3$ yield: 97.1% (on the basis of $F_2$)
$CF_4$: 0.0013 vol %
$COF_2$: Not detected
COF: Not detected
$OF_2$: Not detected
$N_2O$: Not detected As evident from the results, the use of the high purity fluorine gas and the high purity ammonia gas suppressed the generation of by-products which were small amounts of impurities. The results also showed that the target product $NF_3$ was produced continuously in high yield (97% or more) by feeding the raw material gases at low concentrations, controlling the temperature in the reactor and removing the solid product from the reactor.

The reaction was further continued, and the peak temperature in the reactor 3 after 24 hours from the start of the reaction was 16.4° C. The gas collected from the gas discharge line was analyzed in the same way as above. The result is shown below.

$NF_3$ yield: 97.4% (on the basis of $F_2$)

The reaction was further continued, and the peak temperature in the reactor 3 after 48 hours from the start of the reaction was 16.5° C. The gas collected from the gas discharge line was analyzed in the same way as above. The result is shown below.

$NF_3$ yield: 97.2% (on the basis of $F_2$)

Thereafter, the feeding of the raw material gases and the diluting gases was stopped. Visual observation of the inside of the reactor and solid storage tank showed that there was no white solid product attached to the inside of the reactor, and that a white solid product (mainly composed of ammonium fluoride) was accumulated in the solid storage tank.

As evident from these results, the target product $NF_3$ was produced continuously in high yield by feeding the raw material gases at low concentrations, controlling the temperature in the reactor and knocking off the solid product from the reactor.

Example C2

The reaction was carried out in the same way as in Example C1 except that the $F_2$ gas obtained in Preparation Example C2 was used in place of the high purity $F_2$ gas and the $NH_3$ gas obtained in Preparation Example C4 was used in place of the high purity $NH_3$ gas. The peak temperature in the reactor 3 after 4 hours from the start of the reaction was 16.5° C.

The gas collected from the gas discharge line was treated with an aqueous potassium iodide solution, and thereby unreacted fluorine gas and hydrogen fluoride produced were removed. The gas was analyzed by gas chromatography. The results are shown below.

$NF_3$ yield: 97.1% (on the basis of $F_2$)
$CF_4$: 0.0136 vol %
$COF_2$: 0.0002 vol %
COF: 0.0002 vol %
$OF_2$: 0.0001 vol %
$N_2O$: 0.0003 vol %

The comparison of Example C1 with Example C2 showed that the use of the high purity raw material gases suppressed the generation of by-products which were small amounts of impurities.

[Examples in which Two Reactors were Used in Combination]

<Preparation of $F_2$ Gas>

Preparation Example D1

A composition of KF•1.8HF to KF•2.5HF was subjected to molten-salt-electrolysis at approximately 100° C. to generate $F_2$ at an anode, and the gas was collected. The collected crude $F_2$ gas was purified by separating HF using liquid nitrogen. Subsequently, the resultant $F_2$ gas was subjected to low-temperature distillation with liquid nitrogen to give a high purity fluorine gas. Oxygen, oxygen-containing compounds and tetrafluoromethane contained in the high purity fluorine gas were determined by TCD method and FID method of gas chromatography (GC) and with a gas chromatography mass spectrometer (GC-MS). The results are shown below.

Oxygen and oxygen-containing compounds 0.0610 vol %
Tetrafluoromethane 0.0013 vol %

Preparation Example D2

A composition of KF•1.8HF to KF•2.5HF was subjected to molten-salt-electrolysis at approximately 100° C. to generate $F_2$ at an anode, and the gas was collected. The collected crude $F_2$ gas was purified by separating HF using liquid nitrogen to give a fluorine gas. Oxygen, oxygen-containing compounds and tetrafluoromethane contained in the fluorine gas were determined by TCD method and FID method of gas chromatography (GC) and with a gas chromatography mass spectrometer (GC-MS). The results are shown below.

Oxygen and oxygen-containing compounds 0.3320 vol %
Tetrafluoromethane 0.0108 vol %

<Preparation of $NH_3$ Gas>

Preparation Example D3

Liquid ammonia, produced by a high pressure catalytic method which was an industrial manufacturing method, was evaporated with use of a heat exchanger and was collected by cooling. The collected product was further purified by distillation to give high purity ammonia. Oxygen, oxygen-containing compounds, methane and oils contained in the high purity ammonia were determined by TCD method and FID method of gas chromatography (GC) and with a gas chromatography mass spectrometer (GC-MS). The results are shown below.

Oxygen and oxygen-containing compounds <0.5 vol ppm
Methane <0.1 vol ppm
Oils <0.1 mass ppm Preparation Example D4

Liquid ammonia, produced by a high pressure catalytic method which was an industrial manufacturing method, was analyzed by TCD method and FID method of gas chromatography (GC) and with a gas chromatography mass spectrometer (GC-MS) to determine oxygen, oxygen-containing compounds, methane and oils contained in the liquid ammonia. The results are shown below.

Oxygen and oxygen-containing compounds 0.0110 vol %
Methane 0.0008 vol %
Oils 0.0006 mass %

Example D1

Figure 4:
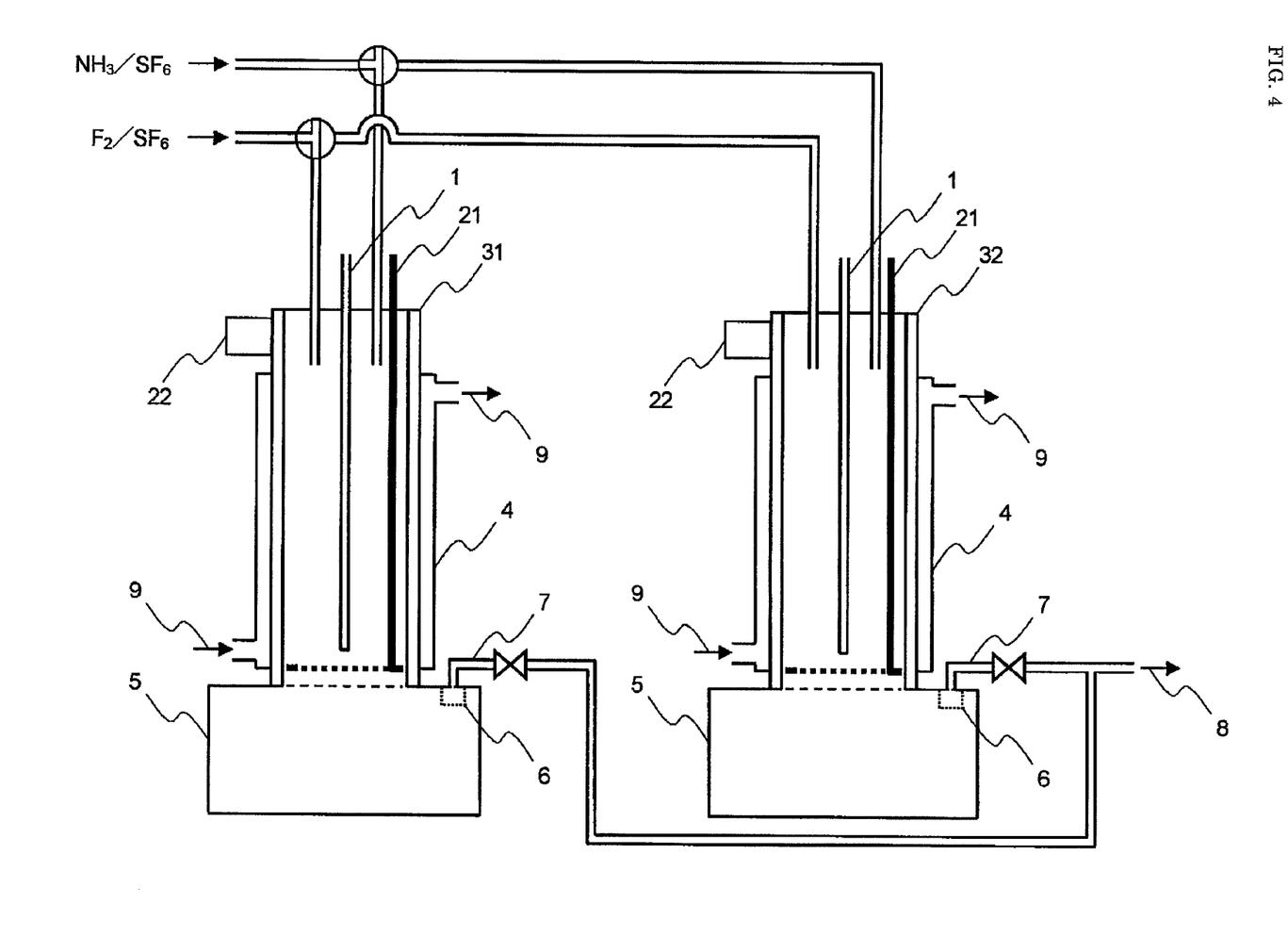
FIG. 4 is a schematic view showing an example of a production apparatus used for a method for producing nitrogen trifluoride of the present invention.

An apparatus shown in FIG. 4 was used. As shown in FIG. 4, SUS 316L tubular reactors 31 and 32 (with a jacket 4, cooling system with cooling medium circulation) having an internal diameter of 54.9 mm and a length of 700 mm were each equipped with two raw material gas feeding lines. The reactors were connected in parallel. In each of these tubular reactors 31 and 32, an automatically vertically movable scraping device 21 was provided in which a shaft (bar) and a handle were mounted on a ring-shaped thin plate having an external diameter of 53.9 mm and an internal diameter of 53.1 mm. On each of the reactors, an air knocker 22 (Air Knocker SK-30, manufactured by Seishin Enterprise Co., Ltd.) was provided. A SUS 316L solid storage tank 5 having an internal diameter of 109.8 mm and a length of 350 mm was mounted at a lower part of each of the tubular reactors 31 and 32. A gas discharge line 7 was connected through a filter 6 to an upper part of each solid storage tank 5.

Fed into the tubular reactor 31 were a mixed gas of the high purity $F_2$ gas obtained in Preparation Example D1 at a rate of 2.3 NL/hr and sulfur hexafluoride (purity:>99.999%) at a rate of 59.64 NL/hr from one of the raw material gas feeding lines of the tubular reactor 31 and a mixed gas of the high purity $NH_3$ gas obtained in Preparation Example D3 at a rate of 3.06 NL/hr and sulfur hexafluoride (purity:>99.999%) at a rate of 50 NL/hr from the other raw material gas feeding line of the tubular reactor 31. The $F_2$ gas and the $NH_3$ gas were mixed and reacted in the reactor 31. During the reaction, the scraping device 21 was driven up and down inside the reactor 31 every 20 minutes by a timer, and the air knocker 22 was operated at a knocker shocking interval of 30 minutes by a timer. The reaction was carried out while cooling the reactor 31 with a cooling medium. After 36 hours from the start of the reaction, the peak temperature in the reactor 31 was 15.8° C.

The gas collected from the gas discharge line was treated with an aqueous potassium iodide solution, and thereby unreacted fluorine gas and hydrogen fluoride produced were removed. The gas was analyzed by gas chromatography. The result is shown below.

$NF_3$ yield: 97.9% (on the basis of $F_2$)

The reaction was further continued in the reactor 31, and the peak temperature in the reactor 31 after 72 hours from the start of the reaction was 15.5° C. The gas collected from the gas discharge line was analyzed in the same way as above. The result is shown below.

$NF_3$ yield: 97.2% (on the basis of $F_2$)

Next, fed in the tubular reactor 32 were a mixed gas of the high purity $F_2$ gas obtained in Preparation Example D1 and sulfur hexafluoride (purity:>99.999%) from one of the raw material gas feeding lines of the tubular reactor 32 and a mixed gas of the high purity $NH_3$ gas obtained in Preparation Example D3 and sulfur hexafluoride (purity:>99.999%) from the other raw material gas feeding line of the tubular reactor 32. The $F_2$ gas and the $NH_3$ gas were mixed and reacted in the reactor 32 while removing a solid product attached to the inside of the tubular reactor 32 under the same conditions as above and while cooling the tubular reactor 32.

Thereafter, the feeding of the raw material gases and the diluting gases to the tubular reactor 31 was stopped, and the reaction was carried out only in the tubular reactor 32. During the reaction, the solid product was removed from the solid storage tank 5 mounted to the tubular reactor 31, and the filter 6 and other parts were cleaned and dried.

After 36 hours from the start of the reaction in the tubular reactor 32, the peak temperature in the reactor 32 was 16.1° C.

The gas collected from the gas discharge line was treated with an aqueous potassium iodide solution, and thereby unreacted fluorine gas and hydrogen fluoride produced were removed. The gas was analyzed by gas chromatography. The result is shown below.

$NF_3$ yield: 97.1% (on the basis of $F_2$)

The reaction was further continued in the reactor 32, and the peak temperature in the reactor 32 after 72 hours from the start of the reaction in the reactor 32 was 15.8° C. The gas collected from the gas discharge line was analyzed in the same way as above. The result is shown below.

$NF_3$ yield: 97.3% (on the basis of $F_2$)

Further, the feeding of the raw material gases and the diluting gases was switched from the tubular reactor 32 to the tubular reactor 31 by the same operation as described above. The second reaction was carried out in the reactor 31 under the same conditions as above. The peak temperature in the reactor 31 after 72 hours from the start of the second reaction in the reactor 31 was 15.7° C. The gas collected from the gas discharge line was analyzed in the same way as above. The result is shown below.

$NF_3$ yield: 97.1% (on the basis of $F_2$)

As evident from these results, $NF_3$ was produced continuously in high yield (97% or more) for a period of time as long as 216 hours or more by using the two reactors and switching these reactors alternately.

Example E1

Figure 5:
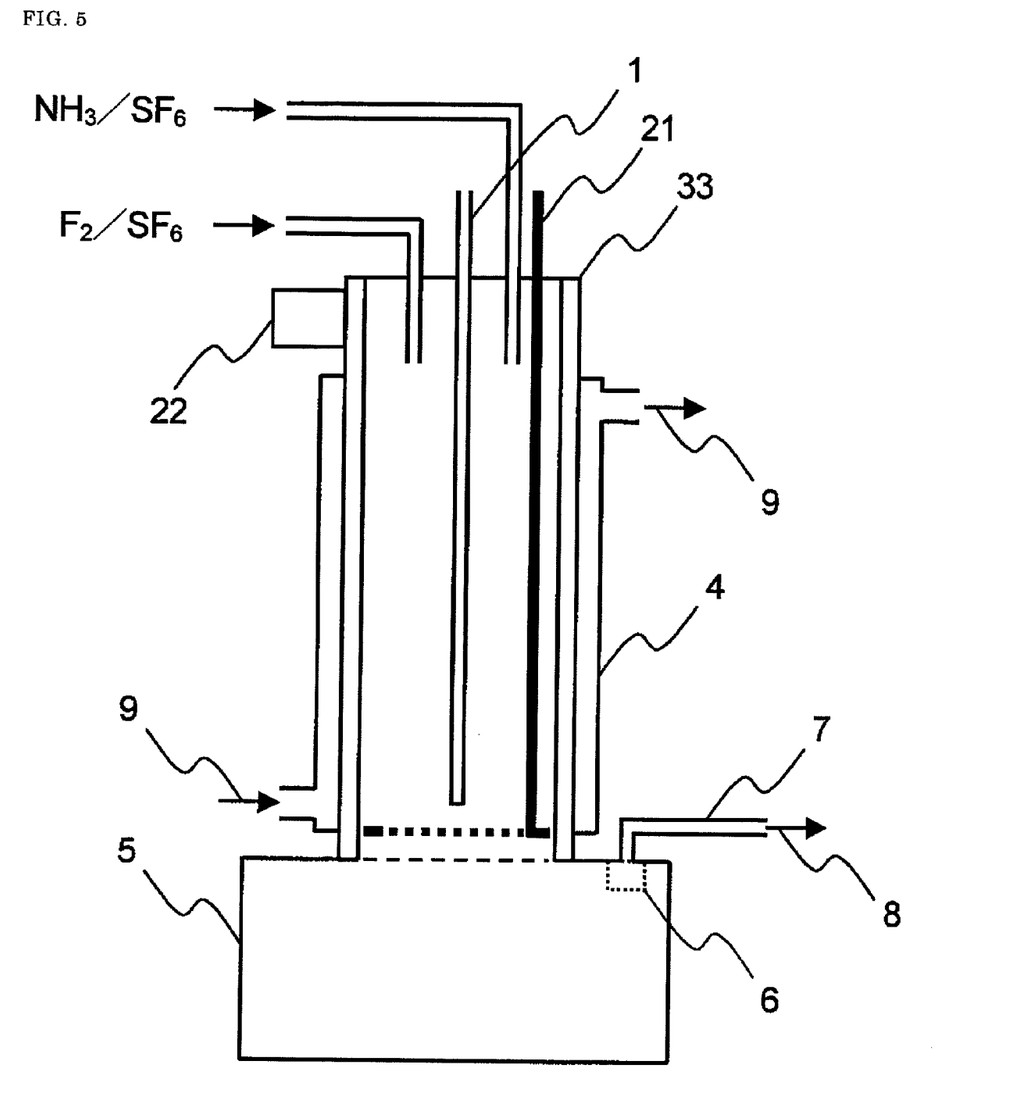
FIG. 5 is a schematic view showing an example of a production apparatus used for a method for producing nitrogen trifluoride of the present invention.

An apparatus shown in FIG. 5 was used. As shown in FIG. 5, a SUS 316L tubular reactor 33 (with a jacket 4, cooling system with cooling medium circulation) having an internal diameter of 54.9 mm and a length of 700 mm was equipped with two raw material gas feeding lines. In the reactor, an automatically vertically movable scraping device 21 was provided in which a shaft (bar) and a handle were mounted on a ring-shaped thin plate having an external diameter of 53.9 mm and an internal diameter of 53.1 mm. On the reactor, an air knocker 22 (Air Knocker SK-30, manufactured by Seishin Enterprise Co., Ltd.) was provided. A SUS 316L solid storage tank 5 having an internal diameter of 109.8 mm and a length of 350 mm was mounted at a lower part of the tubular reactor 33. A gas discharge line 7 was connected through a filter 6 to an upper part of the solid storage tank 5.

Fed into the tubular reactor 33 were a mixed gas of the high purity $F_2$ gas obtained in Preparation Example D1 at a rate of 2.3 NL/hr and sulfur hexafluoride (purity:>99.999%) at a rate of 59.64 NL/hr from one of the raw material gas feeding lines and a mixed gas of the high purity $NH_3$ gas obtained in Preparation Example D3 at a rate of 3.06 NL/hr and sulfur hexafluoride (purity:>99.999%) at a rate of 50 NL/hr from the other raw material gas feeding line. The $F_2$ gas and the $NH_3$ gas were mixed and reacted in the reactor 33. The scraping device 21 was driven up and down inside the reactor 33 every 30 minutes by a timer, and the air knocker 22 was operated at a knocker shocking interval of 30 minutes by a timer. The reaction was carried out while cooling the reactor 33 with a cooling medium. After 10 hours from the start of the reaction, the peak temperature in the reactor 33 was 15.4° C.

The gas collected from the gas discharge line was treated with an aqueous potassium iodide solution, and thereby unreacted fluorine gas and hydrogen fluoride produced were removed. The gas was analyzed by gas chromatography. The results are shown below.

$NF_3$ yield: 97.2% (on the basis of $F_2$)
$CF_4$: 0.0013 vol %
$COF_2$: Not detected
COF: Not detected
$OF_2$: Not detected
$N_2O$: Not detected As evident from the results, the use of the high purity fluorine gas and the high purity ammonia gas suppressed the generation of by-products which were small amounts of impurities, especially $CF_4$. The results also showed that the target product $NF_3$ was produced continuously in high yield (97% or more) by feeding the raw material gases at low concentrations, controlling the temperature in the reactor and removing the solid product from the reactor.

The reaction was further continued, and the peak temperature in the reactor 33 after 48 hours from the start of the reaction was 15.7° C. The gas collected from the gas discharge line was analyzed in the same way as above. The result is shown below.

$NF_3$ yield: 97.5% (on the basis of $F_2$)

The reaction was further continued, and the peak temperature in the reactor 33 after 72 hours from the start of the reaction was 15.9° C. The gas collected from the gas discharge line was analyzed in the same way as above. The result is shown below.

$NF_3$ yield: 97.1% (on the basis of $F_2$)

Thereafter, the feeding of the raw material gases and the diluting gases was stopped. Visual observation of the inside of the reactor and solid storage tank showed that there was no solid product attached to the inside of the reactor.

Example E2

The reaction was carried out in the same way as in Example E1 except that the $F_2$ gas obtained in Preparation Example D2 was used in place of the high purity $F_2$ gas and the $NH_3$ gas obtained in Preparation Example D4 was used in place of the high purity $NH_3$ gas. The peak temperature in the reactor 33 after 24 hours from the start of the reaction was 15.4° C.

The gas collected from the gas discharge line was treated with an aqueous potassium iodide solution, and thereby unreacted fluorine gas and hydrogen fluoride produced were removed. The gas was analyzed by gas chromatography. The results are shown below.

$NF_3$ yield: 97.2% (on the basis of $F_2$)
$CF_4$: 0.00117 vol %
$COF_2$: 0.0002 vol %
COF: 0.0002 vol %
$OF_2$: 0.0001 vol %
$N_2O$: 0.0002 vol %

Thereafter, the feeding of the raw material gases and the diluting gases was stopped. Visual observation of the inside of the reactor and solid storage tank showed that there was no solid product attached to the inside of the reactor.

The comparison of Examples E1 and E2 showed that the use of the high purity raw material gases suppressed the generation of by-products which were small amounts of impurities.

INDUSTRIAL APPLICABILITY

The methods for producing nitrogen trifluoride of the present invention utilize the direct fluorination in which an $F_2$ gas and an $NH_3$ gas are reacted together in the presence of a diluting gas in a gaseous phase under the condition of no catalyst. The methods of the invention overcome the conventional disadvantages and problems, and $NF_3$ may be produced industrially safely, continuously and in high yield.

The invention claimed is:

1. A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor and reacting the gases in the presence of a diluting gas in a gaseous phase under the condition of no catalyst; and removing the solid product attached to an inner wall of the tubular reactor by means of an air-type piston vibration device mounted outside the tubular reactor.

2. The method for producing nitrogen trifluoride according to claim 1, wherein the tubular reactor is installed so that its longitudinal direction is in a vertical direction.

3. The method for producing nitrogen trifluoride according to claim 1, wherein the gases flow in the tubular reactor in a vertically downward direction.

4. The method for producing nitrogen trifluoride according to claim 1, wherein the diluting gas is at least one kind of gas selected from the group consisting of nitrogen, helium, argon, sulfur hexafluoride, hexafluoroethane, octafluoropropane and nitrogen trifluoride.

5. The method for producing nitrogen trifluoride according to claim 1, wherein the diluting gas is recycled.

6. The method for producing nitrogen trifluoride according to claim 1, wherein after the reaction, an unreacted fluorine gas is treated with an aqueous alkaline solution and/or alumina.

7. A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst; scraping off the solid product attached to an inner wall of the tubular reactor by means of a scraping device mounted inside the tubular reactor; and removing the solid product from the gas product by using a device and a filter that are mounted at a lower part of the reactor and separate and discharge solids, wherein the device that is mounted at a lower part of the reactor and separates and discharges solids is a device equipped with a rotary valve.

8. A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst; knocking off the solid product attached to an inner wall of the tubular reactor by means of a hammering device mounted to the tubular reactor; and removing the solid product from the gas product by using a device and a filter that are mounted at a lower part of the reactor and separate and discharge solids, wherein the device that is mounted at a lower part of the reactor and separates and discharges solids is a device equipped with a rotary valve.

9. A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst; knocking off the solid product attached to an inner wall of the tubular reactor by means of an air-type piston vibration device mounted outside the tubular reactor; and removing the solid product from the gas product by using a device and a filter that are mounted at a lower part of the reactor and separate and discharge solids, wherein the device that is mounted at a lower part of the reactor and separates and discharges solids is a device equipped with a rotary valve.

10. A method for producing nitrogen trifluoride comprising producing a gas product mainly composed of nitrogen trifluoride and a solid product mainly composed of ammonium fluoride and/or acidic ammonium fluoride by feeding a fluorine gas and an ammonia gas into a tubular reactor from an upper part of the reactor, the tubular reactor being installed so that its longitudinal direction is in a vertical direction, and reacting the gases in the presence of a diluting gas in a gaseous phase under the condition of no catalyst, the reaction being carried out using two or more of the tubular reactors in a manner such that the two or more tubular reactors are switched alternately; and the method further comprising:

removing the solid product attached to an inner wall of the tubular reactor by using at least one device selected from a hammering device, a scraping device and an air-type piston vibration device, which device is mounted to the tubular reactor, and removing the solid product from the gas product by using a device and a filter that are mounted at a lower part of the reactor and separate and discharge solids, wherein the device that is mounted at a lower part of the reactor and separates and discharges solids is a device equipped with a rotary valve.

11. The method for producing nitrogen trifluoride according to claim 7 or 10, wherein the solid product is scraped off by freely driving the scraping device up and down in a vertical direction in the tubular reactor and/or by freely rotating the scraping device inside the tubular reactor around a vertical axis passing through a center of a radial cross section of the tubular reactor.

12. The method for producing nitrogen trifluoride according to claim 8 or 10, wherein the hammering device is an air knocker.

13. The method for producing nitrogen trifluoride according to claim 10, wherein the fluorine gas is a high-purity fluorine gas in which the total content of oxygen and an oxygen-containing compound is 0.1 vol% or less and the content of tetrafluoromethane is 50 vol ppm or less.

14. The method for producing nitrogen trifluoride according to claim 13, wherein the oxygen-containing compound contained in the high-purity fluorine gas is at least one compound selected from the group consisting of NO, $NO_2$, $N_2O$, CO, $CO_2$, $H_2O$, $OF_2$ and $O_2F_2$.

15. The method for producing nitrogen trifluoride according to claim 10, wherein the ammonia gas is a high-purity ammonia gas in which the total content of oxygen and an oxygen-containing compound is 10 vol ppm or less and the content of oil is 2mass ppm or less.

16. The method for producing nitrogen trifluoride according to claim 15, wherein the oxygen-containing compound contained in the high-purity ammonia gas is at least one compound selected from the group consisting of NO, $NO_2$, $N_2O$, CO, $CO_2$ and $H_2O$.

17. The method for producing nitrogen trifluoride according to claim 10, wherein the fluorine gas is fed in a concentration of 3 mol% or less.

18. The method for producing nitrogen trifluoride according to claim 10, wherein the ammonia gas is fed in a concentration of 6 mol% or less.

19. The method for producing nitrogen trifluoride according to claim 10, wherein the fluorine gas and the ammonia gas are reacted together under a pressure of 0.05 to 1.0 MPa.

20. The method for producing nitrogen trifluoride according to claim 10, wherein the device that is mounted at a lower part of the reactor and separates and discharges solids is an exchangeable solid storage tank.

21. The method for producing nitrogen trifluoride according to any one of claims 1, 7, 8, 9, and 10, wherein the tubular reactor has a cooling structure.

22. The method for producing nitrogen trifluoride according to any one of claims 1, 7, 8, 9, and 10, wherein the fluorine gas and the ammonia gas are reacted together at a temperature of 60° C. or lower.

23. The method for producing nitrogen trifluoride according to any one of claims 1, 7, 8, 9, and 10, wherein the fluorine gas and the ammonia gas are fed in a molar ratio (fluorine gas:ammonia gas) in the range of 1:1 to 1:2.

24. An apparatus for producing nitrogen trifluoride comprising a tubular reactor equipped with fluorine gas feeding means, ammonia gas feeding means, an air-type piston vibration device and reaction temperature controlling means; means for storing a solid product removed from the reactor; and means for separating the solid product from a gas component.

* * * * *